United States Patent
Sun

(10) Patent No.: US 7,877,525 B1
(45) Date of Patent: Jan. 25, 2011

(54) RESUMING MEDIA OBJECTS DELIVERED VIA PROGRESSIVE DOWNLOADING SERVICES UPON DATA LOSS EVENTS

(75) Inventor: Yaojun Sun, South Riding, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 267 days.

(21) Appl. No.: 12/114,534

(22) Filed: May 2, 2008

(51) Int. Cl.
  G06F 3/00   (2006.01)
  G06F 13/00  (2006.01)
  G06F 15/16  (2006.01)
  G06F 15/173 (2006.01)

(52) U.S. Cl. .............. 710/29; 710/30; 710/33; 710/15; 709/217; 709/238

(58) Field of Classification Search ............ None
  See application file for complete search history.

(56) References Cited

U.S. PATENT DOCUMENTS

2008/0162666 A1 * 7/2008 Ebihara et al. ............ 709/217

* cited by examiner

Primary Examiner—Alan Chen

(57) ABSTRACT

Systems, methods, and computer-readable media for resuming a media object presented following a data loss event are provided. A physical disconnection that occurs at a point during the presentation of the media object is detected. The physical disconnection interrupts the presentation of the media object. Upon detecting the physical disconnection, a reestablishment of the physical connection is detected. Subsequently, an option to resume the presentation of the media object at the interrupted point is presented to a user.

19 Claims, 6 Drawing Sheets

RESUMING MEDIA OBJECTS DELIVERED VIA PROGRESSIVE DOWNLOADING SERVICES UPON DATA LOSS EVENTS

SUMMARY

This Summary is provided to introduce a selection of concepts in a simplified form that are further described below in the Detailed Description. Embodiments of the present invention are defined by the claims below. This Summary is intended to summarize embodiments of the invention and is not intended to limit the scope of the claims in any way.

In embodiments, one or more computer-readable media having computer-useable instructions embodied thereon for performing a method for resuming a media object presented on a device following a data loss event that interrupts the presentation of the media object, wherein a portion of the media object has been delivered to a device via a progressive downloading service is provided. The method includes recognizing a physical disconnection that occurs at a point during the presentation of the media object, the physical disconnection interrupting the presentation of the media object. A reestablishment of a physical connection is detected. Subsequently, an option to resume the presentation of the media object at the interrupted point is presented.

In other embodiments, one or more computer-readable media having computer-useable instructions embodied thereon for performing a method for resuming a media object presented on a device following a data loss event that interrupts the presentation of the media object, wherein a portion of the media object has been delivered to a device via a progressive downloading service is provided. The method includes receiving one or more media packets at a media proxy communicated from a media server, the media packet corresponding with the media object requested to be presented on the device. A state of the media proxy is identified. The state is associated with one or more actions to apply to the one or more media packets, wherein a store state is identified upon the occurrence of a data loss event and a forward state is identified upon the reception of a request to present or download the media object or upon the reception of a request to resume the media object at the point at which it was interrupted. Thereafter, one or more actions are performed in accordance with the identified state, wherein the one or more actions associated with the forward state comprise forwarding the one or more media packets to the device and the one or more actions associated with a store state comprise storing the one or more media packets at the media proxy.

In still further embodiments, a set of computer-useable instructions provide a method for performing a method for resuming a media object presented on a device following a data loss event that interrupts the presentation of the media object, wherein a portion of the media object has been delivered to a device via a progressive downloading service is provided. The method includes communicating a first set of one or more packets to the device, the one or more packets received from a media server. Thereafter, a failed connection between the device and the media proxy is recognized. Based on the recognized connection failure, a second set of one or more packets are stored at the media proxy, the second set of one or more packets received at the media proxy after the connection failure was recognized. An indication that a connection between the device and the media proxy has been reestablished is received. Based on the indication of the established connection, the second set of one or more packets are communicated to the device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
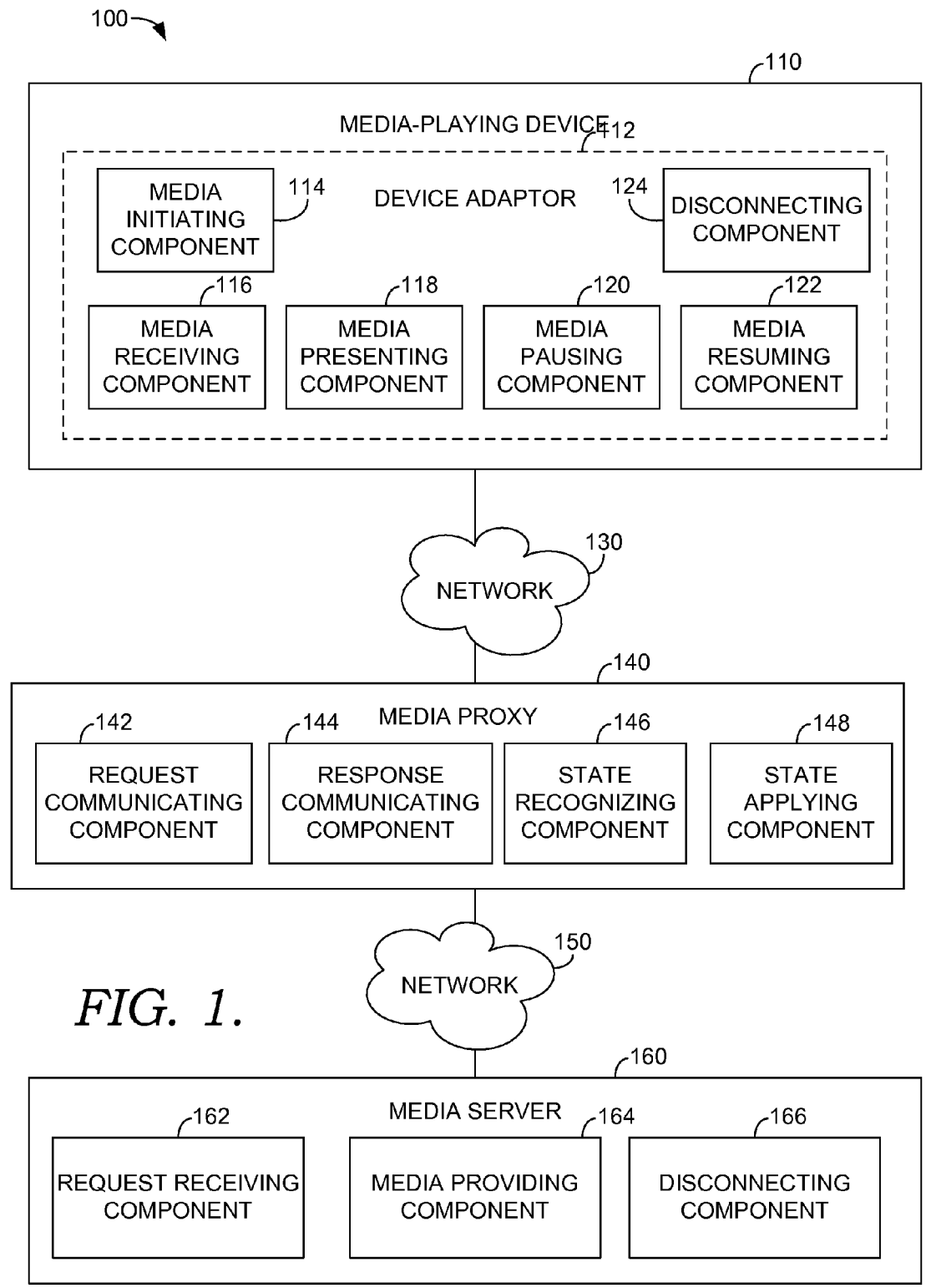
FIG. 1 is a block diagram of an exemplary computing system for resuming media objects upon data loss events, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CD-ROM | Compact Disk Read Only Memory |
| DAP | Digital Audio Player |
| DVD | Digital Versatile Discs |
| EEPROM | Electrically Erasable Programmable Read Only Memory |
| MP3 | MPEG-1 Audio Layer 3 |
| PC | Personal Computer |
| PDA | Personal Digital Assistant |
| PMP | Portable Media Player |
| PVP | Portable Video Player |

-continued

| | |
|---|---|
| RAM | Random Access Memory |
| ROM | Read Only Memory |

As one skilled in the art will appreciate, embodiments of the present invention may be embodied as, among other things, a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention relate to systems, methods, and computer-readable media for resuming media objects upon data loss events that interrupt the presentation of the media objects, wherein progressive downloading services are utilized to deliver the media objects to devices presenting the media objects. In embodiments, progressive downloading services can be utilized to deliver media objects to a device. A media object, as used herein, refers to any media content including, but not limited to, videos, songs, movies, games, and/or any other type of media content, or portions thereof. As such, a media object can be, for example, an audio media object, a video media object, a combination thereof, and the like. Progressive downloading services, as used herein, refers to a particular method for delivering data to a device over a network, such as the Internet, that enables the presentation of a downloaded portion of a media object while the download is in progress. That is, although a download of a media object to a device might not be complete, the device can begin presenting the media object. By way of example only, assume a media server delivers media data over the Internet to a device. Upon the device receiving a particular amount of media data buffered on the device, the device may begin presenting the media object even though the entire media object has not been transferred to the device.

While a media object is being presented via a device, data loss events oftentimes occur. A data loss event, as used herein, refers to a loss of data (e.g., voice packets or data packets) during or prior to transmission to a device. In embodiments, a data loss event comprises a loss of a physical connection (i.e., a physical disconnection). That is, the physical layer of data connections might be disrupted or lost. In wireless environments (e.g., 3G or 4G), data connections, such as Internet Protocol (IP) connections, are oftentimes disrupted due to wireless radio conditions and other services (e.g., voice and push-to-talk). Due to a lack of radio coverage and/or radio condition changes, a physical connection can be lost (i.e., a data loss event can occur). For example, in instances where a mobile device is in an elevator, a radio signal might not be able to operate through a metal shield of the elevator walls and, as such, the mobile device can lose connectivity with the mobile base station. Such data loss events oftentimes interrupt the presentation of a media object. That is, in instances where a progressive downloading service is utilized to deliver a media object to a device, the occurrence of a data loss event can interrupt the presentation of the media object.

As previously set forth, embodiments of the present invention relate to systems, methods, and computer-readable media for resuming media objects upon data loss events that interrupt the presentation of the media objects, wherein progressive downloading services are utilized to deliver the media objects to the devices presenting the media objects. By way of example only, assume that a portion of a media object is delivered to a device via progressive downloading services and, as such, the device begins to present the media object. Further assume that a data loss event occurs, such as a physical disconnection, and interrupts the downloading of the media object. Accordingly, the transmission of media data associated with the media object is disrupted. Embodiments of the present invention enable the resumption of the presentation of the media object at substantially the same position at a later instance as though no interruption (e.g., data loss event) occurred. That is, upon a data loss event, a media object can be presented at the point it was interrupted when the data loss occurred. As such, a user experience can continue without having to initiate a new download of the media object from the beginning. Additionally, such resumptions can occur despite device and media server relationships.

Referring to the drawings generally, and initially to FIG. 1 in particular, an exemplary computing system 100 for practicing an embodiment of the present invention is provided. It will be understood and appreciated by those of ordinary skill in the art that the computing system 100 shown in FIG. 1 is merely an example of one suitable computing system and is not intended to suggest any limitation as to the scope of use or functionality of the present invention. Neither should the computing system 100 be interpreted as having any dependency or requirement related to any single component or combination of components illustrated therein. The single unit depictions are meant for clarity, not to limit the scope of embodiments in any form.

As shown in FIG. 1, an exemplary computing system 100 includes a media-playing device 110, a media proxy 140, and a media server 160. Media-playing device 110, media proxy 140, and media server 160 are capable of communicating via a communications network, such as network 130 and network 150. Network 130 and network 150 might comprise, for example, cable networks, the Internet, wireless networks, or a combination thereof or portions thereof. In embodiments, network 130 and/or network 150 include an array of devices, which are not shown so as to not obscure more relevant aspects of the invention. Components such as a base station, a communications tower, or even a WiFi access point (as well as other components) can provide wireless connectivity in some embodiments. Communications network 130 and network 150 may be combined into a single network or can include multiple networks, as well as being a network of networks, but is shown in more simple form so as to not obscure other aspects of the present invention.

Network 130 enables communication between media-playing device 110 and media proxy 140. In one embodiment, network 130 comprises a wireless network. Network 150 enables communication between media proxy 140 and media server 160. In one embodiment, network 150 comprises a physically wired network, such as a landline, Ethernet, or the like. Such a physically wired network utilized for communication between the media proxy 140 and the media server 160 reduces the likelihood of physical disconnections and other data loss events between the media server 160 and the media proxy 140, thereby, enhancing user experience. Although single components are illustrated for clarity, one skilled in the art will appreciate that network 130 can enable communication between multiple devices and/or multiple media proxies, and network 150 can enable communication between multiple media proxies and/or multiple media servers.

The media-playing device 110 is utilized to request media objects and to present the requested media objects to a user. As used herein, the phrase "media-playing device" refers to any electronic device capable of presenting media objects. As such, media-playing device 110 may take on a variety of forms, such as a personal computer (PC), a laptop computer, a mobile phone, a personal digital assistant (PDA), a portable media player (PMP), or any other device that is capable of presenting media objects as described herein. A portable media player (PMP) device may include, without limitation, a portable video player (PVP) and/or a digital audio player (DAP), such as a MP3 player. Accordingly, a media-playing device 110 that is capable of presenting media objects may be variously referred to herein as a media device, a portable media device, a portable media player, a media player, and the like. Makers of illustrative media-playing devices include, for example, Research in Motion, Creative Technologies Corp., Samsung, Apple Computer, and the like. A media-playing device can include, for example, a display, a power source (e.g., a battery), a data store, a speaker(s), and the like. In one embodiment, a media-playing device comprises a wireless or mobile media-playing device.

In one embodiment, the media-playing device 110 includes a media initiating component 114, a media receiving component 116, a media presenting component 118, a media pausing component 120, a media resuming component 122, and a disconnecting component 124. In some embodiments, one or more of the illustrated components may be implemented as stand-alone applications. In other embodiments, one or more of the illustrated components may be integrated directly into the operating system of the media-playing device 110. It will be understood by those of ordinary skill in the art that the components illustrated in FIG. 1 are exemplary in nature and in number and should not be construed as limiting. Any number of components may be employed to achieve the desired functionality within the scope of embodiments hereof.

As illustrated in FIG. 1, in some embodiments, the media-playing device 110 includes a device adaptor 112. A device adaptor 112 interfaces with the media-playing device 110 and communicates with the media proxy 140. A device adaptor 112 might be used to adapt existing media-playing devices or media-player devices lacking resuming functionality such that media objects can be resumed upon a data loss event. In an embodiment where a device adaptor 112 is utilized, the device adaptor 112 might comprise the media initiating component 114, the media receiving component 116, the media presenting component 118, the media pausing component 120, the media resuming component 122, and the disconnecting component 124. Alternatively, the device adaptor 112 might comprise a portion of such components, while the remaining components, or portions thereof, exist on the media-playing device independent from the device adaptor 112. For example, the media presenting component 118 may reside independent from the device adaptor 112 while the remaining components, or portions thereof, exist within the device adaptor 112.

The media initiating component 114 is configured to initiate a progressive download of a media object. That is, the media initiating component 114 initiates the presentation of a media object by requesting such a media object that is delivered via a progressive download service. By way example, media initiating component 114 might generate and/or communicate a media request. A media request refers to a data packet that includes a request for a media object, for example, to be downloaded and/or presented. In one embodiment, such a media request is communicated to the media proxy 140 via network 130.

In one implementation, the media request might include a downloading instruction and a media object identifier to identify the media object desired to be downloaded or presented. A media object identifier refers to any identifier that identifies a particular media object. Such a media object identifier can be utilized to reference or obtain the desired media object. A media object identifier may comprise, for example, a value, a track title, a container label, a track icon, an artist, a symbol, an image, a link, or any other feature that may identify a media object.

In embodiments, the media initiating component 114 might be configured to initiate a progressive download of a media object upon detecting an indication to initiate the presentation and/or download of a media object. In one embodiment, an indication to initiate the presentation of a media object is provided by a user. In such an embodiment, a user may navigate to a desired media object identifier. Upon navigating to a desired media object identifier, the user can provide an indication to initiate the presentation and/or download of a media object. For example, a user may navigate to a Video 1 and provide an indication to play Video 1. A user-provided indication to initiate a presentation and/or download of a media object might include a user's selection of a media object identifier associated with the media object desired for presentation. In such a case, a user can select a media object identifier by, for example, double-clicking on a media object identifier, right-clicking on a media object identifier, hovering over a media object identifier, dragging and dropping a media object identifier, providing an audio command, selecting a media object identifier via a touch screen, and the like.

Media initiating component 114 might be configured to detect an indication to initiate a media object upon attaining a certain threshold and/or parameter. For example, assume that hovering over a media identifier provides an indication to initiate the presentation of a media object. In such a case, media initiating component 114 may detect the indication after a media object identifier is hovered over, for example, for two seconds. Such thresholds and parameters might provide a more user-friendly user interface.

In an alternative embodiment, an indication to initiate the presentation and/or download of a media object may be automatically provided. In such an embodiment, an indication to initiate the presentation of a media object may be automatically provided based on the occurrence of an event. Such an event may include, for example, initiating a media player or a media browser, navigating to a website, and the like.

Although the media initiating component 114 is illustrated as a single component, one skilled in the art will appreciate that media initiating component 114 might, in fact, comprise multiple components or multiple portions. By way of example only, a first portion of media initiating component 114 might reside within media-playing device 110 but remote from device adaptor 112 while a second portion of media initiating component 114 resides within device adaptor 112. In such an embodiment, the first portion of media initiating component 114 residing within media-playing device 110 might be configured to detect an indication to initiate a presentation and/or download of a media object and to generate a media request for such an event to be communicated to the media server 160. The second portion residing within the device adaptor 112 might be configured to intercept the media request generated by the media-playing device 110 to be communicated to media server 160. Upon intercepting the media request generated by the media-playing device 110, the second portion of the media initiating component 114 might modify the communication so that it is directed to the media proxy 140 rather than the media server 160.

The media receiving component 116 is configured to receive communications from the media proxy 140, the media server 160, or a combination thereof. Such communications include, for example, media responses and media data. A media response, as used herein, refers to a packet communicated in response to a media request that indicates a receipt of the media request. Media data, as used herein, refers to a packet having media content (e.g., a media object, or a portion thereof). The media data enables the presentation of a media object on a device. In some embodiments, the media data received by a media-playing device 110 might be stored locally, either temporarily or permanently.

Upon receiving media data, in some embodiments, a media data confirmation might be generated and/or communicated to indicate that the media data was received. A media data confirmation can be generated and/or communicated for each media data packet received or for multiple media data packets received. In one embodiment, media receiving component 116, or other component of the media-playing device 110, is configured to generate and/or communicate a media data confirmation. For example, assume that a media data packet is received by media receiving component 116. Upon receipt of the media data packet, media receiving component 116 might, in response, generate and communicate a media data confirmation to a media proxy or media server that indicates receipt of the media data packet.

Although the media receiving component 116 is illustrated as a single component, one skilled in the art will appreciate that media receiving component 116 might, in fact, comprise multiple components or multiple portions. By way of example only, a first portion of media receiving component 116 might reside within media-playing device 110 but remote from device adaptor 112 while a second portion of media receiving component 116 resides within device adaptor 112. In such an embodiment, the first portion of media receiving component 116 residing within media-playing device 110 might be configured to receive media data and to generate a media data confirmation to be communicated to the media server 160. The second portion residing within the device adaptor 112 might be configured to intercept the media data confirmation generated by the media-playing device 110 to be communicated to media server 160. Upon intercepting the media data confirmation generated by the media-playing device 110, the second portion of the media receiving component 116 might communicate and/or modify the media data confirmation so that it is directed to the media proxy 140 rather than the media server 160.

The media presenting component 118 is configured to present or display the media object, or portions thereof. In some embodiments, the media presenting component 118 utilizes a display screen associated with the media-playing device, an audio system associated with the media-playing device, or a combination thereof. The media presenting component 118 might present the media object as the media packets are received or upon the device receiving a particular amount of media data buffered on the device. The media presenting component 118 can reside within the device adaptor 112 or within the media-playing device independent from the device adaptor 112.

The media pausing component 120 is configured to pause the media object being presented on media-playing device 110. In one embodiment, the media pausing component 120 is configured to detect data loss events. Upon detecting such a data loss event, the media pausing component 120 automatically communicates a pause request to the media presenting component 118 or other application associated with presenting the media object. The pause request can be communicated upon detection of the data loss event or upon the completion of presenting all media data downloaded to the media-player device. By way of example only, upon detecting a lost physical connection, the media pausing component 120 communicates a pause request to the media presenting component 118. Such a pause request might result in pausing the media object being presented at, or near, the time the pause request is received or, alternatively, pausing the media object after the media data buffered on the device is exhausted. In some implementations, the media pausing component 120 is additionally or alternatively configured to communicate a data loss event notice to media proxy 140 and/or media server 160. The media pausing component 120 might be configured to recognize and store the point of the media object at which the data loss event occurred, the pause effect occurred, or the like so that the media object can be resumed at substantially the same point it was interrupted.

In an alternative embodiment, the media pausing component 120 is not necessary for the resume functionality. In such an embodiment, upon a data loss event, such as a physical disconnection, the media-playing device 110 is unable to communicate with the media proxy 140 and/or the media server 160. Accordingly, the media presenting component 118 might continue presenting the media object until the media data buffered on the device is exhausted. The media proxy 140 and/or media server 160 identify the data loss event based on the lack of media data confirmations communicated from the media-playing device 110, as discussed more fully below.

The media resuming component 122 is configured to resume the media object at substantially the same point the media object was interrupted as though no interruption occurred (e.g., without restarting the media object at the beginning). By way example, media resuming component 122 might generate and/or communicate a presentation resume request, a download resume request, or a combination thereof. A presentation resume request refers to a request for resuming the presentation of the media object. Such a presentation resume request might be utilized in embodiments where a pause request is communicated to the media presenting component 118, or other component. The presentation resume request can include, for example, an indication of the point at which the media object should continue playing.

A download resume request refers to a data packet that includes a request for resumption of a media object download, such as a video object or an audio object, so that the media object can be resumed on the media-playing device. In one implementation, the download resume request might include an indication of the last (i.e., most recent) media data received by the media-playing device 110, an indication of a point at which the media object was interrupted, a resuming instruction, and/or a media object identifier to identify the media object desired to be resumed. In one embodiment, such a download resume request is communicated to the media proxy 140 via network 130.

In embodiments, the media resuming component 122 might be configured to generate and/or communicate a resume request, such as a presentation resume request and/or a download resume request, upon detecting an indication to resume a media object. In one embodiment, the completion of a data loss event might provide an indication to initiate the resumption of a media object. For example, assume the media resuming component 122, or another component, detects a physical connection after a period of a physical disconnection (i.e., the data loss event comprising physical disconnection is completed). In such a case, the media resuming component 122 might automatically, without user intervention, generate and/or communicate a resume request to the media proxy 140, the media presenting component 118, or a combination thereof.

In another embodiment, an indication to initiate the resumption of a media object is provided by a user via a user interface. Such a user interface might be automatically presented, or presented upon user request, by the media resuming component 122 upon the completion of a data loss event. In some implementations, the user interface provides a user with an option to resume the currently paused media object.

In other implementations, a user may navigate to a media object identifier associated with a media object desired to be resumed. Upon navigating to a desired media object identifier, the user can provide an indication to initiate the resumption of a media object. For example, a user may navigate to a Video 1 and provide an indication to resume Video 1. A user-provided indication to initiate a resumption of a media object might include a user's selection of a media object identifier associated with the media object desired to be resumed. In such a case, a user can select a media object identifier by, for example, double-clicking on a media object identifier, right-clicking on a media object identifier, hovering over a media object identifier, dragging and dropping a media object identifier, providing an audio command, selecting a media object identifier via a touch screen, and the like.

Media resuming component 122 might be configured to detect an indication to resume a media object upon attaining a certain threshold and/or parameter. For example, assume that hovering over a media identifier provides an indication to resume the presentation of a media object. In such a case, media resuming component 122 may detect the indication after a media object identifier is hovered over for two seconds. Such threshold and/or parameters may provide a more user-friendly user interface.

The disconnecting component 124 is configured to disconnect the media-playing device 110 from the media proxy 140 and/or media server 160. To disconnect the media-player device, the disconnecting component 124 might generate and communicate a disconnection packet that indicates a disconnection or a request to disconnect. In some cases, a disconnection packet might be generated and communicated upon detecting a user indication that indicates a desire to end the downloading process. For example, in instances where a user interface is provided to a user to enable the resumption of a media object, rather than selecting to resume the media object, a user might select to discontinue the downloading process. Alternatively, in some cases, a disconnection packet might be generated and communicated upon the occurrence of an event (e.g., media download complete) or the lapse of a time or time period (e.g., a disconnection occurred for a specific amount of time). For example, assume a media-playing device 110 is configured to disconnect after the device has been paused for twenty-four hours. In such a case, upon the lapse of the twenty-four hour period, a disconnection packet might be generated and communicated to the media proxy 140.

The media proxy 140 is configured to communicate with media-playing device 110 via the network 130 and to communicate with media server 160 via the network 150. One skilled in the art will appreciate that any number of media proxies can be used to communicate with media-playing devices and media servers. For example, a single media proxy can provide support for multiple media-player devices, multiple media servers, or a combination thereof. The media proxy 140 services the requests of media-playing device 110 by forwarding requests to other servers, such as media server 160. In embodiments, the media proxy 140 enables the resumption of a media object following a data loss event even though the entire media object has not been delivered to the media-player device. Such a media proxy 140 that performs resuming functionality, as more fully described below, enables an enhanced user experience following data loss events (e.g., continue media object at point of interruption) without requiring a modification of media servers, such as media server 160.

In one embodiment, media proxy 140 includes a request communicating component 142, a response communicating component 144, a state recognizing component 146, and a state applying component 148. The request communicating component 142 is configured to communicate a media request to a media server, such as media server 160. In one embodiment, the request communicating component 142 is configured to receive a media request, for example, from the media-playing device 110. For example, upon the media-playing device 110 receiving a user indication to download and/or present a media object, a first media initiating component of a media-playing device 110 might generate a media request to be communicated to the media server, and a second media initiating component residing within a device adaptor, such as device adaptor 112, might intercept the generated media request and communicate the media request to the media proxy 140.

Upon receiving a media request, request communicating component 142 communicates (e.g., forwards) the media request to an appropriate media server. In embodiments, the request communicating component 142 might be configured to identify an appropriate media server to which to direct the media request, cache the media request, and/or modify the media request (e.g., alter the packet header).

The response communicating component 144 is configured to communicate a media response to a media-player device, such as media-playing device 110. In one embodiment, the response communicating component 144 is configured to receive a media response, for example, communicated from the media server 160, as discussed more fully below. Upon receiving a media response, response communicating component 144 communicates (e.g., forwards) the media response to an appropriate media-playing device. In embodiments, the response communicating component 144 might be configured to identify an appropriate media-playing device to which to direct the media response, cache the media response, and/or modify the media response (e.g., alter the packet header).

The state recognizing component 146 is configured to recognize a state of the media proxy. In some embodiments, the media proxy 140 is configured to service multiple media-playing devices. In such an embodiment, at one instance, each media-playing device might be associated with a different state. Accordingly, state recognizing component 146 might be configured to recognize a first state associated with a first media-playing device and a second state associated with a second media-playing device.

In one embodiment, a state might comprise, for example, an initial state, a forward state, a store state, or an end state. An initial state refers to a state initially applied prior to the media proxy 140 receiving a media request. An initial state might indicate that the media proxy is available and operating properly.

A forward state refers to a state that indicates to apply a forwarding action to media data received from a media server, such as media server 160. That is, when a forward state is applied, media data received from the media server 160 is communicated to media-playing device 110. In some embodiments, a forward state may include identifying a destination for the media data and/or storing the media data at the media proxy 140 prior to communicating the media data to the appropriate media-player device. Such a state might exist, for example, during the period following the reception of a media request when no data loss event is detected.

A store state refers to a state that indicates to apply a storing action to media data received from a media server, such as media server 160. As such, when a store state is applied, media data received from the media server 160 is stored within a storage device associated with the media proxy 140. In one embodiment, such a state might exist during the period following the detection of a data loss event and prior to receiving an indication to return to a forward state or an end state.

An end state refers to a state that indicates to apply a releasing action to media data stored within the media proxy. That is, when an end state is applied, media data stored within the media proxy 140 is released from storage. In some implementations, an end state includes disconnecting the media proxy 140 from the media-playing device 110 and/or the media server 160. Such a state might exist, for example, upon an indication to terminate the downloading and/or presenting of the media object, upon the lapse of a time or time period, or the like.

State indicators might be utilized to recognize a state. A state indicator, as used herein, refers to any indication that signifies a state or state modification (e.g, change from a first state to a second state). By way of example only, a forward state indicator (i.e., a state indicator that indicates a forward state) might comprise a reception of a media request and/or a download resume request. As such, upon the media proxy 140 receiving a media request and/or a download resume request, a forward state can be recognized.

A store state indicator (i.e., a state indicator that indicates a store state) might comprise the detection or recognition of a data loss event. In one embodiment, data loss events might be detected or recognized using any detection or recognition mechanism. For example, such a detection or recognition of a data loss event may occur upon the failure to receive a media data confirmation (e.g., a communication from a device) indicating that one or more media data have been received by the media-playing device. Alternatively, a reception of a data loss event notice received by a media proxy can indicate a data loss event. Upon the media proxy 140 detecting or recognizing a data loss event, a store state can be recognized.

An end state indicator (i.e., a state indicator that indicates an end state) might comprise, for example, a lapse of a time or time duration, the completion of the presentation or downloading of a media object, or a user indication to terminate the presentation or download of a media object. A lapse of a time or time duration might occur in instances where media data has been stored for a specific time period. As such, upon the media proxy 140 detecting or receiving an indication of such events, an end state can be recognized.

In one embodiment, recognizing a state occurs upon an occurrence of an event or a lapse of time or time period. That is, upon an occurrence of an event or lapse of time or time period, state recognizing component 146 is configured to recognize a state that exists upon such an occurrence. The occurrence of an event may include, for example, each instant a communication (e.g., packet) is received from a media-playing device 110 and/or a media server 160. A lapse of time or time period refers to a lapse of any time or time period. For example, state recognizing component 146 might be configured to recognize a state every five milliseconds.

Figure 2:
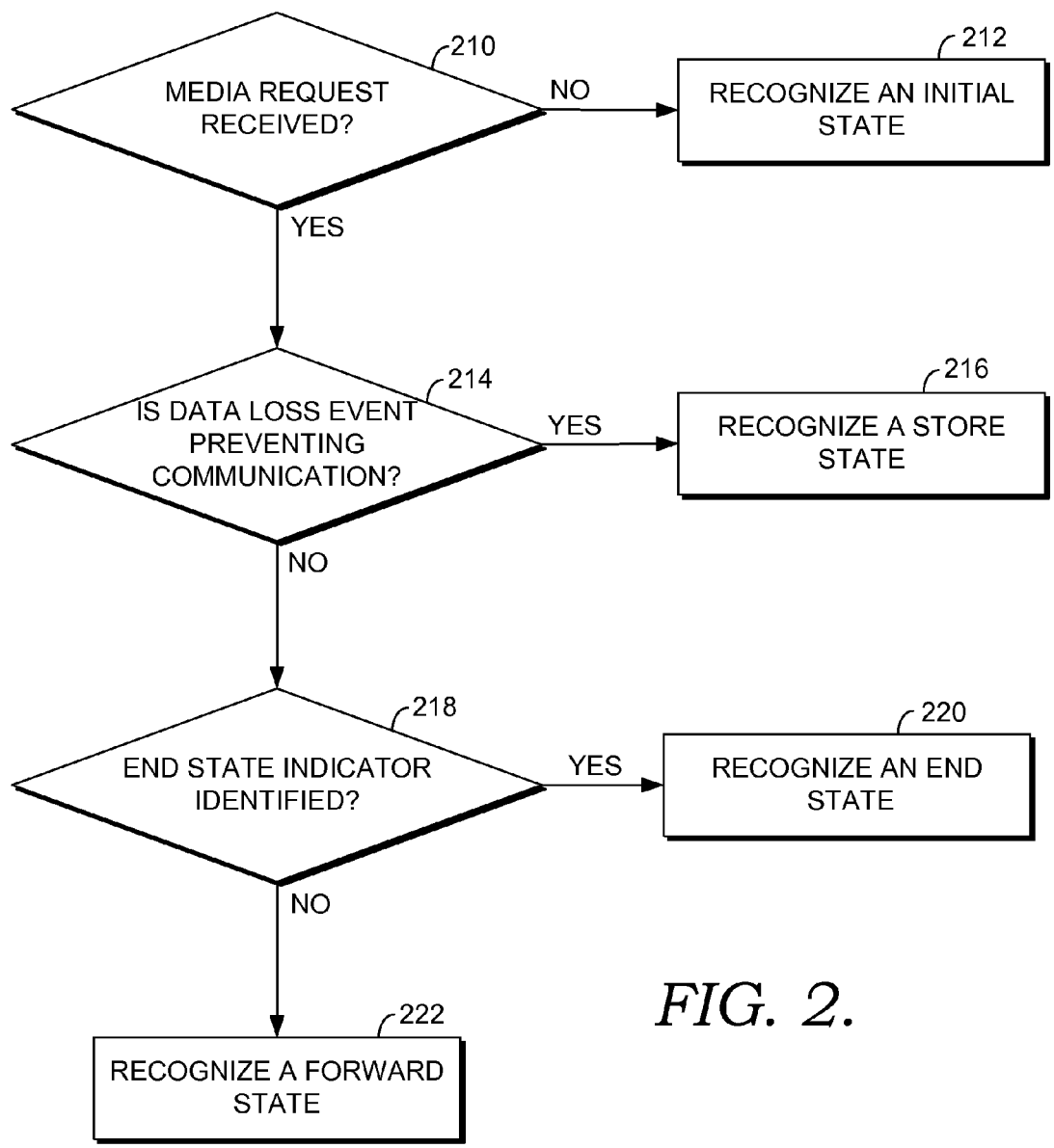
FIG. 2 is an exemplary method for recognizing a state upon the occurrence of an event or a lapse of time/time period in accordance with an embodiment of the present invention.

In such an embodiment, upon the occurrence of a predetermined event or time duration, a state is recognized. Referring now to FIG. 2, an exemplary method for recognizing a state upon the occurrence of an event or a lapse of time/time period in accordance with an embodiment of the present invention is presented. Initially, as indicated at block 210, it is determined if a media request has been received by the media proxy. If a media request has not been received, an initial state is recognized as the state existing upon the occurrence of the event or lapse of time. This is indicated at block 212. If a media request, however, has been received, it is determined at block 214 if a data loss event, such as a physical disconnection, is preventing or disrupting communication with the media-playing device 110. If a data loss event is disabling communication with the media-playing device 110, a store state is recognized as the state existing upon the occurrence of the event or lapse of time. This is indicated at block 216. If a data loss event, on the other hand, is not disabling communication with the media-playing device 110, it is determined at block 218 if an end state indicator has been identified. If an end state indicator has been identified by the media proxy, an end state is recognized as the state existing upon the occurrence of the event or lapse of time, as indicated at block 220. If, however, an end state indicator has not been identified, for example, by the media proxy, a forward state is identified as the state existing upon the occurrence of the event or lapse of time, as indicated at block 222.

Figure 3:
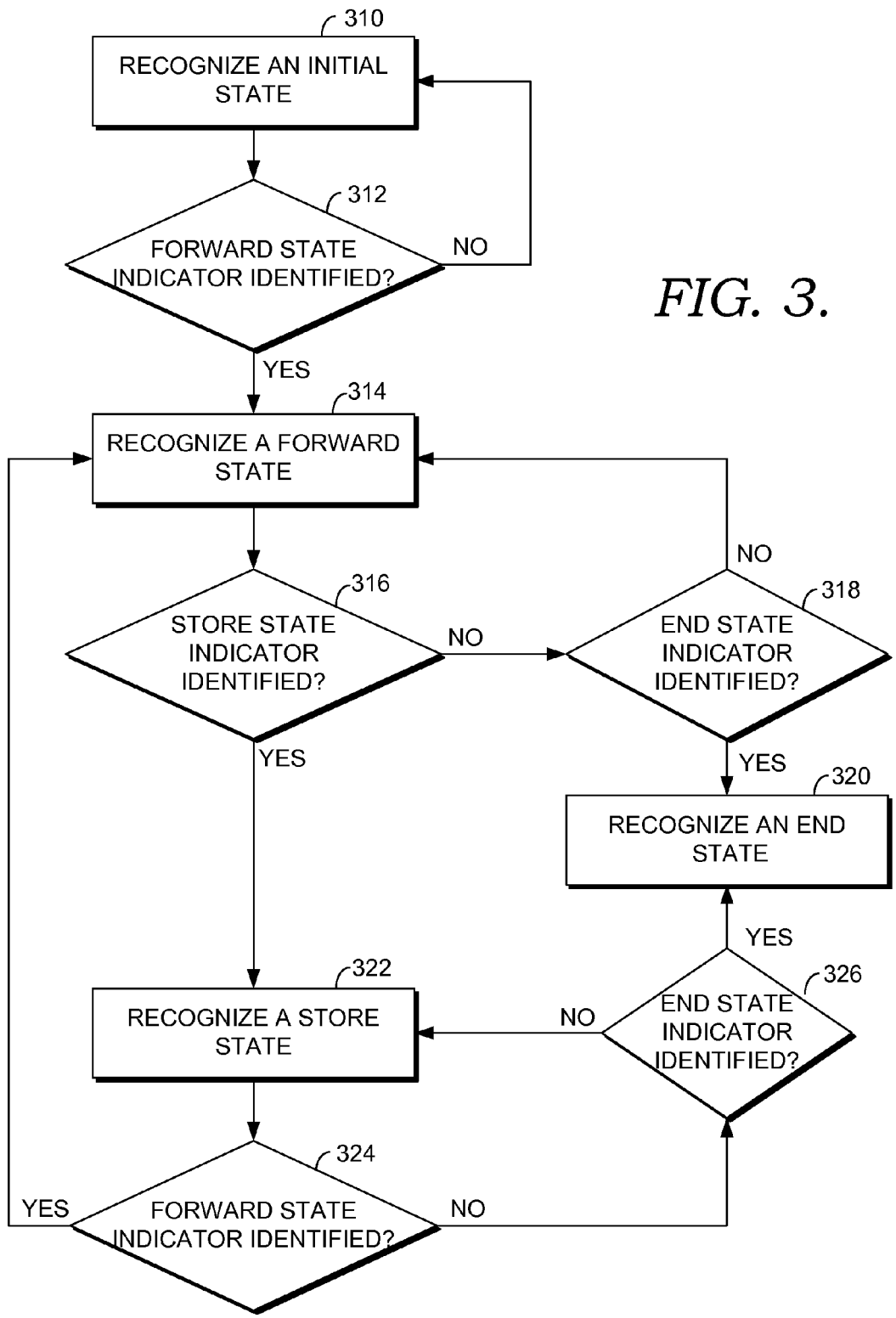
FIG. 3 is an exemplary method for recognizing a state upon identifying a state indicator, in accordance with an embodiment of the present invention.

In an alternative embodiment, a recognition of a state occurs upon detecting or identifying a state indicator associated with a state. That is, upon identifying a state indicator, the state indicated by the state indicator is recognized as the existing state until the state is modified (e.g., a new state indicator is identified). Such a recognized state is applicable until a new state is identified. By way of example only, and with reference to FIG. 3, an exemplary method for recognizing a state upon identifying a state indicator in accordance with an embodiment of the present invention. Initially, as indicated at block 310, an initial state is recognized. Such an initial state might be a default state when no other state is recognized. It is determined if a forward state indicator is identified at block 312. Such a forward state indicator can include a reception of a request for a media object. If a forward state indicator is not identified, an initial state is recognized, as indicated at block 310. Such an initial state is applicable until a forward state indicator, such as a media request, is identified at block 312.

Upon identifying a forward state indicator, a forward state is recognized, for example, based on the reception of the media request. This is indicated at block 314. At block 316, it is determined if a store state indicator has been identified. Such a store state indicator might include an indication that a data loss event has occurred. If a store state indicator has not been identified, it is determined at block 318 if an end state indicator has been identified. Such an end state indicator might include, but is not limited to, a completion of a presentation or download of a media object, or a user termination of a presentation or download of a media object. If it is determined at block 318 that an end state indicator has not been identified, a forward state is recognized. Such a forward state is applicable until one of a store state indicator or an end state indicator is identified. If, however, it is determined at block 318 that an end state indicator has been identified, an end state is recognized, as indicated at block 320.

Returning to block 316, if it is determined that a store state indicator has been identified, a store state is recognized. This is indicated at block 322. Subsequently, at block 324, it is determined if a forward state indicator is identified. Such a forward state indicator may include, for example, a reception of a download resume request or other indication that a data loss event has completed. If it is determined that a forward state indicator is identified, a forward state is recognized at block 324. If, on the other hand, it is determined that a forward state indicator is not identified, it is determined at block 326 if an end state indicator is identified. Such an end state indicator might include, for example, an indication of a lapse of a time or time duration or a termination of a presentation or downloading of a media object. If an end state indicator is not identified, the store state remains the recognized state, as indicated at block 322. If, however, it is determined that an end state indicator is identified, an end state is recognized, as indicated at block 320.

Referring again to FIG. 1, the state applying component 136 is configured to apply one or more actions in accordance with the recognized state. The one or more actions to apply vary depending on the recognized state. By way of example only, in instances where a forward state is the recognized state, a forwarding action is applied to each media data received from the media server 160. In some cases, a storing action might also be applied where a forward state is the recognized state. A recognized store state can result in a storing action being applied to each media data received from the media server 160. In instances where an end state is the recognized state, a releasing action might be applied to media data stored within the media proxy. Such a releasing action, in one embodiment, might occur one time upon recognizing an end state. A disconnecting action also might be applied in instances where an end state is the recognized state.

The media server 160 is configured to communicate media data. In one embodiment, the media server includes a request receiving component 162, a media providing component 164, and a disconnecting component 166. The request receiving component 162 is configured to receive a media request. In embodiments, the media proxy 140 communicates the media request to the media server 160. In one implementation, the request receiving component 162, or other component, is configured to provide a media response indicating that the media request was received.

The media providing component 164 is configured to provide media data in response to the media request. In embodiments, the media providing component 164 might reference, extract, or retrieve media data associated with the media object requested. Such media data might be stored in a data store residing within the media server 160 or remote from the media server 160.

The disconnecting component 166 is configured to disconnect the media server 160 from the media proxy 140. In one embodiment, the disconnecting component 166 might perform the disconnection upon delivering the last media data associated with the media object to the media proxy 140. In an alternative embodiment, the disconnecting component 166 might provide the media proxy 140 with an indication that the last media data associated with the desired media object has been transmitted. In such an embodiment, the media proxy 140 might, upon receipt of the indication, initiate a disconnection.

Figure 4:
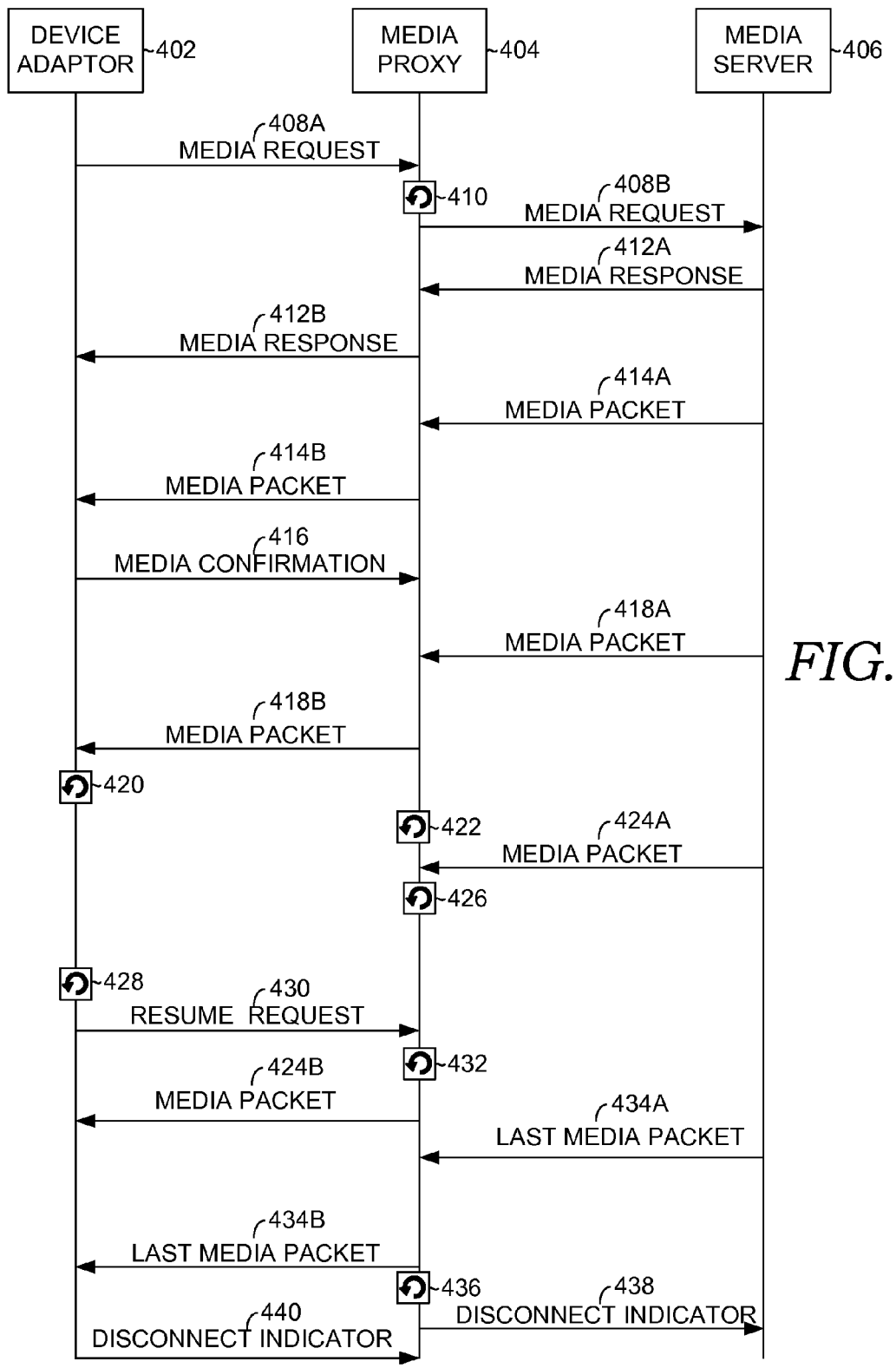
FIG. 4 is an exemplary flow chart illustrating a method for resuming a media object upon a data loss event, in accordance with an embodiment of the present invention.

By way of example only, and with reference to FIG. 4, an exemplary flow chart illustrating a method for resuming a media object upon a data loss event is shown. Initially, a media request 408a is communicated from a device adaptor 402 to a media proxy 404. Upon receipt of media request 408a, media proxy 404 recognizes a forward state, as indicated at block 410. Media proxy 404 communicates media request 408b to a media server 406. In response, the media server 406 communicates a media response 412a to media proxy 404, which, in turn, communicates media response 412b to device adaptor 402. Media server 406 communicates media packet 414a to media proxy 404. As the media proxy 404 recognized a forward state at block 410, media proxy stores and communicates media packet 414b to device adaptor 402. In response to receiving media packet 414b, device adaptor 402 communicates a media data confirmation 416 to the media proxy 404. Media server 406 communicates media packet 418a to media proxy 404, which communicates media packet 418b to the device adaptor 402. Assume that prior to communicating a media data confirmation, device adaptor 402 recognizes that a data loss event occurred, as indicated at block 420. As such, device adaptor 402 does not communicate a media data confirmation in response to receiving the media packet 418b. As the media proxy 404 does not receive a media data confirmation indicating receipt of the media packet 418b, media proxy 404 recognizes a stored state, as indicated at block 422.

Media server 406 communicates media packet 424a to media proxy 404. As the media proxy 404 recognized a store state at block 422, media proxy stores the media packet 424a, as indicated at block 426. At block 428, the device adaptor 402 recognizes that the data loss event has concluded (e.g., a connection is reestablished). Accordingly, the device adaptor 402 communicates a download resume request 430 to the media proxy 404. The download resume request can be automatically provided or provided based on a user indication. Subsequently, the device adaptor 402 recognizes a forward state, as indicated at block 432. Accordingly, the stored media packet 424b is communicated to device adaptor 402.

A last media packet 434a is communicated from media server 406 to media proxy 404. As the media proxy 404 recognized a forward state at block 432, media proxy forwards the last media packet 434b to device adaptor 402. Upon receiving the last media packet 434b, the media proxy 404 recognizes an end state at block 436 and, as such, provides a disconnecting indication 438 to the media server 406. Upon the device adaptor 402 receiving the last media packet 434b, the device adaptor 402 provides a disconnecting indication 440 to the media proxy 404.

Figure 5:
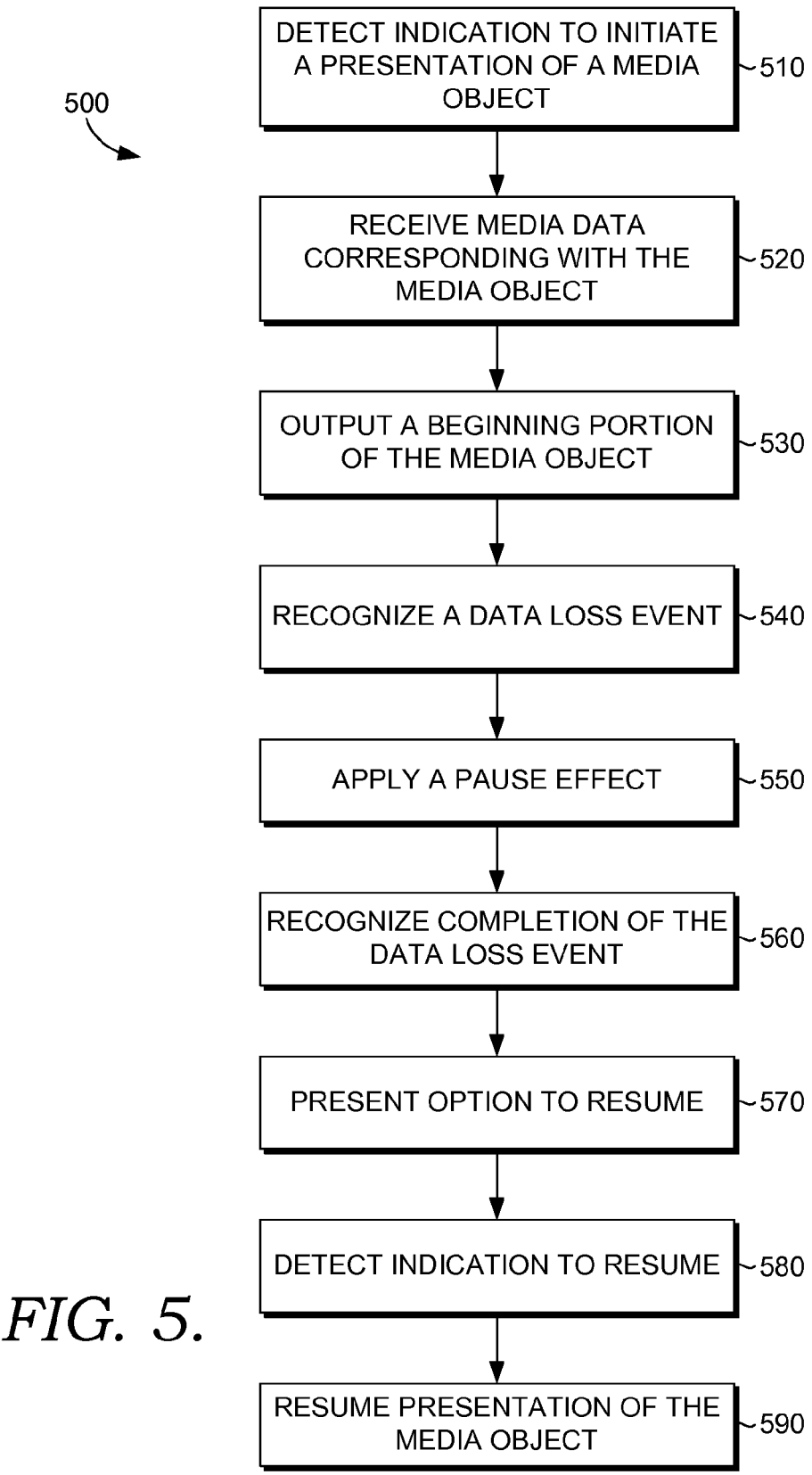
FIG. 5 is a flow diagram illustrating an exemplary method for resuming a media object presented on a device following a data loss event, in accordance with an embodiment of the present invention.

Referring now to FIG. 5, an exemplary method for resuming a media object presented on a device following a data loss event in accordance with an embodiment of the present invention is presented. Initially, as indicated at block 510, an indication to initiate a presentation of a media object is detected. Thereafter, at block 520, media data corresponding with the media object is received. Upon receiving at least a portion of the media data corresponding with the media object, a beginning portion of the media object is output. This is indicated at block 530. At block 540, a data loss event that occurs at a point during the presentation of the media object is recognized. Upon recognizing the data loss event, a pause effect is applied at block 550. A pause effect can include communicating a pause request to a presentation component, continuing the presentation until the media data downloaded to the device is exhausted, or the like. At block 560, a completion of the data loss event is recognized. Thereafter, an option to resume the presentation of the media object at the interrupted point is presented to a user. This is indicated at block 570. An indication to resume the presentation of the media object is detected at block 580. In some embodiments, an indication to resume the presentation can be provided automatically upon completion of the data loss event, rather than provided by a user indication. At block 590, the presentation of the media object resumes at substantially the same point at which the presentation of the media object was interrupted.

Figure 6:
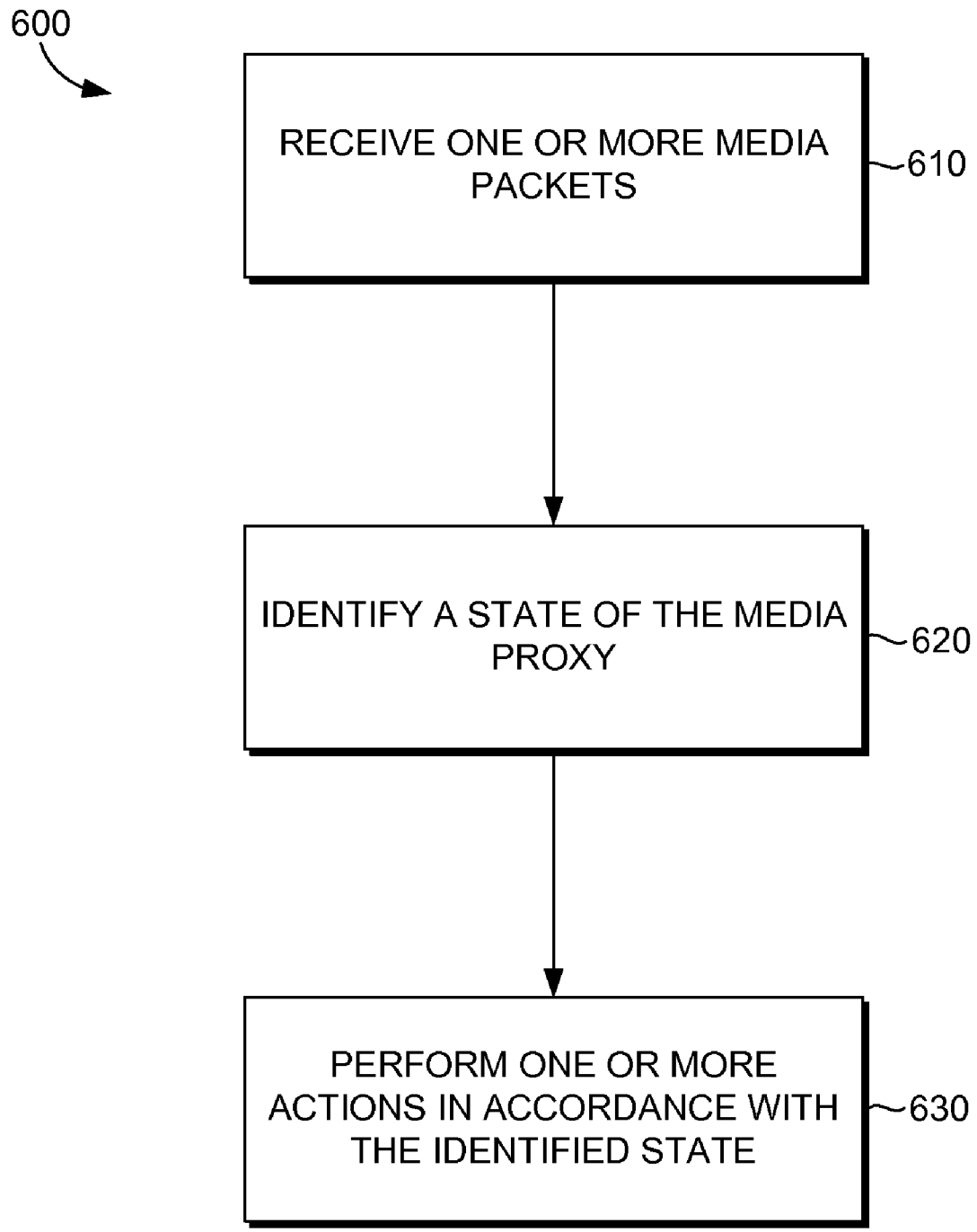
FIG. 6 is a flow diagram illustrating an exemplary method for resuming a media object upon a data loss event utilizing a media proxy, in accordance with an embodiment of the present invention.

With reference to FIG. 6, in accordance with an embodiment of the present invention, an exemplary method 600 for resuming a media object upon a data loss event is illustrated. Initially, as indicated at block 610, one or more media packets are received from a media server. The media packet might correspond with the media object requested to be presented on a device. At block 620, a state of the media proxy is identified. The state of the media proxy is associated with one or more actions to apply, for example, to the one or more media packets. In embodiments, a store state is identified upon the occurrence of a data loss event, and a forward state is identified upon the reception of a request to present or download the media object or upon the reception of a request to resume the media object at the point at which it was interrupted. Subsequently, at block 630, the one or more actions are performed in accordance with the identified state. Actions associated with the forward state comprise forwarding the one or more media packets to the device. Actions associated with a store state comprise storing the one or more media packets at the media proxy.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. One or more computer-readable storage media having computer-executable instructions embodied thereon that, when executed, perform a method for resuming a media object presented on a device following a data loss event that interrupts the presentation of the media object, wherein a portion of the media object has been delivered to a device via a progressive downloading service, the method comprising:
recognizing a physical disconnection that occurs at a point during the presentation of the media object, the physical disconnection interrupting the presentation of the media object;
detecting a reestablishment of a physical connection;
presenting an option to resume the presentation of the media object at the interrupted point; and
communicating an indication to resume delivery of the media object at the interrupted point, the indication to resume delivery being communicated to a media proxy storing the media object received from a media server at the interrupted point of the media object, wherein the media proxy is remote from the media server.

2. The one or more computer-readable media of claim 1, wherein the media object comprises an audio media object, a video media object, or a combination thereof.

3. The one or more computer-readable media of claim 1 further comprising detecting an indication to initiate the presentation of a media object.

4. The one or more computer-readable media of claim 1 further comprising detecting an indication to resume the presentation of the media object.

5. The one or more computer-readable media of claim 4 further comprising resuming the media object, wherein the media object resumes at substantially the same point at which the presentation of the media object was interrupted.

6. The computer-readable media of claim 1 further comprising receiving media data associated with the media object from the media proxy in response to the resume request.

7. The computer-readable media of claim 1 further comprising automatically pausing the media object upon recognizing the physical disconnection.

8. One or more computer-readable storage media having computer-executable instructions embodied thereon that, when executed, perform a method for resuming a media object presented on a device following a data loss event that interrupts the presentation of the media object, wherein a portion of the media object has been delivered to a device via a progressive downloading service, the method comprising:
receiving one or more media packets at a media proxy communicated from a media server, the one or more media packets corresponding with the media object requested to be presented on the device;
identifying a state of the media proxy, the state associated with one or more actions to apply to the one or more media packets received from the media server, wherein a store state is identified upon the occurrence of a data loss event and a forward state is identified upon the reception of a request to present or download the media object or upon the reception of a request to resume the media object at the point at which it was interrupted; and
performing the one or more actions in accordance with the identified state, wherein the one or more actions associated with the forward state comprise forwarding the one or more media packets to the device and the one or more actions associated with a store state comprise storing the one or more media packets at the media proxy.

9. The one or more computer-readable media 8, wherein the media proxy is remote from the device and the media server.

10. The one or more computer-readable media 8, wherein the media object comprises a video media object, an audio media object, or a combination thereof.

11. The one or more computer-readable media 8, wherein an end state is identified upon the lapse of a time or time duration, upon a user indication, or upon the completion of the presentation or download.

12. The one or more computer-readable media 11, wherein the one or more actions associated with the end state comprises releasing any stored media packets.

13. The one or more computer-readable media 8, wherein the forward state further comprises storing the one or more media packets.

14. The one or more computer-readable media 8 further comprising receiving the request to resume the media object at the point at which it was interrupted.

15. The one or more computer-readable media 8 further comprising recognizing the data loss event.

16. One or more computer-readable storage media having computer-executable instructions embodied thereon that, when executed, perform a method for resuming a media object presented on a device following a data loss event that interrupts the presentation of the media object, wherein a portion of the media object has been delivered to a device via a progressive downloading service, the method comprising:

communicating, from a media proxy, a first set of one or more packets to the device, the one or more packets received from a media server;

recognizing a failed connection between the device and the media proxy;

based on the recognized connection failure, storing a second set of one or more packets at the media proxy, the second set of one or more packets received at the media proxy from the media server after the connection failure was recognized;

receiving an indication that a connection between the device and the media proxy has been reestablished; and based on the indication of the established connection, communicating the second set of one or more packets to the device.

17. The one or more computer-readable media 16, wherein the indication of the established connection comprises a downloading resume request initiated by a user selection to resume the media object.

18. The one or more computer-readable media 16 further comprising communicating a third set of one or more packets to the device.

19. The one or more computer-readable media 16, wherein the connection failure is recognized based on the failure to receive media data confirmations indicating that the device received the media data.

* * * * *